United States Patent [19]

Stroud

[11] Patent Number: 4,971,098
[45] Date of Patent: Nov. 20, 1990

[54] VALVE AND IMPROVED SEAT SEAL THEREFOR

[75] Inventor: Daryl R. H. Stroud, Gloucester, England

[73] Assignee: Cooper Industries, Inc., Houston, Tex.

[21] Appl. No.: 446,646

[22] Filed: Dec. 6, 1989

[51] Int. Cl.$^5$ .......................... F16K 3/36; F16K 25/00
[52] U.S. Cl. .............................. 137/246.12; 251/175; 251/196; 251/327; 251/328; 277/72 FM; 277/75
[58] Field of Search ...................... 137/246.12, 246.21, 137/246.22; 251/172, 175, 195, 196, 326, 327, 328; 277/71, 72 FM, 75, 117

[56] References Cited

U.S. PATENT DOCUMENTS

| | | | |
|---|---|---|---|
| 2,660,397 | 11/1953 | Volpin | 137/246.12 |
| 2,980,129 | 4/1961 | Sherman | 137/246.12 |
| 3,006,599 | 10/1961 | Eckert, Jr. | 251/328 |
| 3,135,285 | 6/1964 | Volpin | 251/328 |
| 3,273,855 | 9/1966 | Wells | 251/328 |
| 3,567,178 | 3/1971 | Nelson | 251/214 |
| 3,610,654 | 10/1971 | Torres | 277/71 |
| 3,696,831 | 10/1972 | Fowler et al. | 251/327 |
| 4,029,294 | 6/1977 | McCaskill et al. | 251/328 |
| 4,124,194 | 11/1978 | Alvarez et al. | 251/159 |
| 4,264,054 | 4/1981 | Morrill | 251/328 |
| 4,272,055 | 6/1981 | Herd | 251/214 |
| 4,363,465 | 12/1982 | Morrill | 251/214 |
| 4,541,449 | 8/1985 | Burke et al. | 137/72 |
| 4,685,655 | 8/1987 | Herd | 251/195 |

OTHER PUBLICATIONS

Illustration on pp. 864–867 of the Cameron Iron Works U.S.A., Inc., catalog of 1988 as published in the *Composite Catalog* by World Oil Publishing Company, vol. 1, pp. 864–867 of the '88–'89 Edition.

*Primary Examiner*—George L. Walton

[57] ABSTRACT

An improved seal ring for sealing across the annular space between the exterior of a seat ring and the inner surface of a counterbore recess surrounding the entry of either the inlet or outlet into the valve chamber within the valve body, the seal ring including a pair of radially extending flanges connected by a tubular connector extending between the radial midportions of the flanges and the leading flange having inner and outer sealing surfaces which provide a high interference fit seal between the recess inner surface and the seat ring outer surface and the trailing flange having inner and outer sealing surfaces which provide a low interference fit seal between the recess inner surface and the seat ring outer surface. A spacer ring is provided to seat against the shoulder of the counterbore recess and retain the sealing flanges.

8 Claims, 7 Drawing Sheets

VALVE AND IMPROVED SEAT SEAL THEREFOR

BACKGROUND

The present invention relates to a gate valve and to an improved lubricated seal for the seats within the gate valve which surround the passages therein and engage the exterior of the gate.

An example of the type of valve to which the present invention may be applied is the McEvoy Model C Valve. This valve is illustrated on page 864–7 of the Cameron Iron Works, U.S.A., Inc. catalog of 1988 as published in the *Composite Catalog* by World Oil Publishing Company, Volume 1, page 864–7 of the '88–'89 Edition. This shows and describes a gate valve which includes a pair of seats between the inner ends of the passages and the gate which are each provided with a pressure responsive system for the automatic injection of sealant for a self-sealing action to provide operation long after normal wear on the gates and seats would have caused other valves to leak.

U.S. Pat. No. 4,264,054 discloses a gate valve with an automatic sealant injection system to inject sealant through the seat rings and assist in sealing between the seat ring and the counterbore in the body in which the seat ring is positioned. The patent discloses a particular type of sealing structure including a dished metal ring gasket and a retainer ring. The sealant injection system is exposed to the pressure within the valve chamber for the powering of the sealant injection.

U.S. Pat. No. 4,363,465 discloses another gate valve having automatic sealant injection associated with the seat rings and discloses specific stem sealing means including dished metal ring gaskets.

U.S. Pat. No. 4,541,449 discloses a special seat ring for a gate valve in which the seat ring has a lip biased to seal against the body surface and being exposed to the pressure in the valve chamber to prevent bypass leakage through the valve chamber. Another structure of a seat ring with a lip seal is disclosed in U.S. Pat. No. 4,568,062. Another type of gate valve seat ring having a tubular extension which provides an interference type lip seal in the seat recess in the valve body, is disclosed in U.S. Pat. No. 4,489,918.

U.S. Pat. No. 4,124,194 discloses a gate valve structure in which the seat ring includes a support member, a flexible member and the seat member which is urged by the flexible member positioned between the seat member and the support member into engagement with the gate. The seat member has lip seals for engaging the gate.

U.S. Pat. No. 3,273,855 discloses a variety of seat rings with lip seals and other sealing means for sealing against the seat ring recess in the body and against the gate.

SUMMARY

The present invention relates to an improved gate valve and to an improved gate valve seat sealing assembly. It includes the usual gate valve body with its inlet, outlet, valve chamber, gate and means for moving the gate. The improved seat sealing assembly includes a seat ring to fit in each of the recesses surrounding the openings of the inlet and outlet into the valve chamber and to engage the side of the gate in sealing relationship so that when the gate is closed flow does not leak thereby. The seat rings of the preferred embodiment each include a cylindrical chamber with a sealant therein and a piston slidable in the cylindrical chamber at the top of the sealant. A passage extends through the seat rings to a position within and facing the interior surface of the seat recesses which is sealed by the seal ring. The seal ring includes two sealing elements joined together by a tubular portion with at least one port therethrough and the seal ring is positioned to have one of the sealing element on each side of the opening of the passage which faces the interior surface of the seat recess. A means is provided to retain the seal ring in this position and the sealing elements are sized to provide a seal on each side of the passage opening.

An object of the present invention is to provide an improved gate valve with an improved seat sealing assembly utilizing an automatic sealant injection system and a seal ring which provides an improved seal on each side of the sealant passage opening.

Another object is to provide an improved seat sealing assembly for a gate valve in which the assembly is easily installed and provides improved sealing.

A further object of the present invention is to provide an improved seat sealing assembly for a gate valve which has improved sealing and rigidity to ensure sealing.

BRIEF DESCRIPTION OF THE DRAWINGS

These and other objects and advantages are hereinafter set forth and explained with reference to the drawings wherein.

DESCRIPTION OF THE PREFERRED EMBODIMENTS

Figure 1:
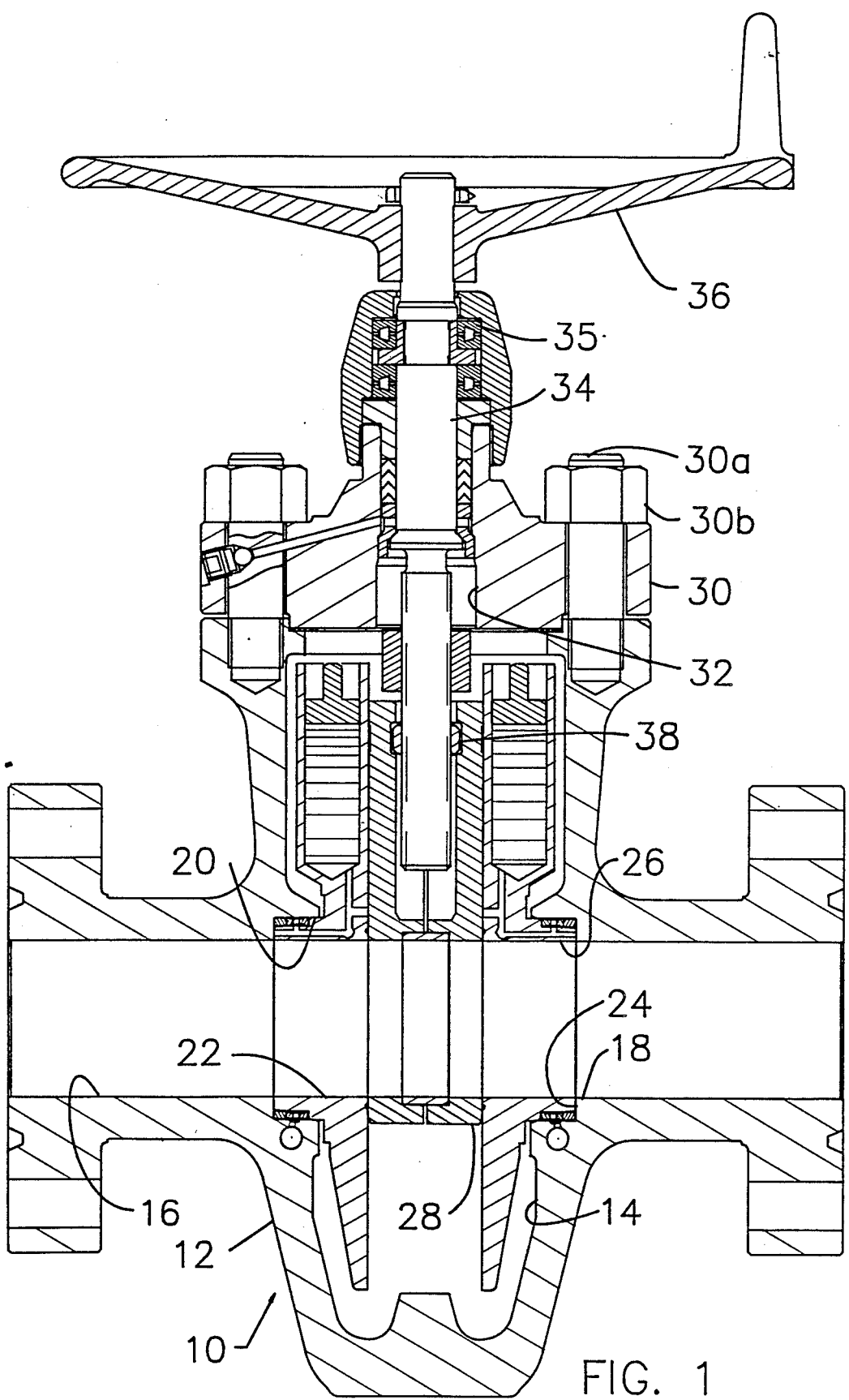
FIG. 1 is a sectional view of the improved valve of the preferred embodiment of the present invention.

As shown in FIG. 1, valve 10 is the improved gate valve of the present invention including the improved seat seal of the present invention. Valve 10 includes body 12 having valve chamber 14 therein with inlet 16 extending through body 12 into chamber 14 and outlet 18 extending through body 12 into the opposite side of chamber 14. Recess 20 surrounds the inner end of inlet 16 and receives inlet seat ring 22. Recess 24 surrounds the inner end of outlet 18 and receives outlet seat ring 26. Gate 28 is positioned in chamber 14 between seat rings 22 and 26 as shown. Bonnet 30 is secured to body 12 by studs 30a and nuts 30b and includes a central bore 32 extending therethrough to receive gate stem 34 which connects from gate 28 through bore 32 to a suitable gate operating or moving means, which for valve 10, as shown, is handwheel 36. Stem 34 is suitably mounted in bonnet bore 32 for rotation therein without axial movement by suitable bearing means 35. Handwheel 36 is secured to the outer end of stem 34 so that rotation of handwheel 36 causes stem 34 to rotate within nut 38 which is secured within gate 28. Stem 34 threads through nut 38 so that the rotation of stem 34 results in an axial movement of gate 28 with respect to stem 34, seat rings 22 and 26 and valve chamber 14.

Figure 2:
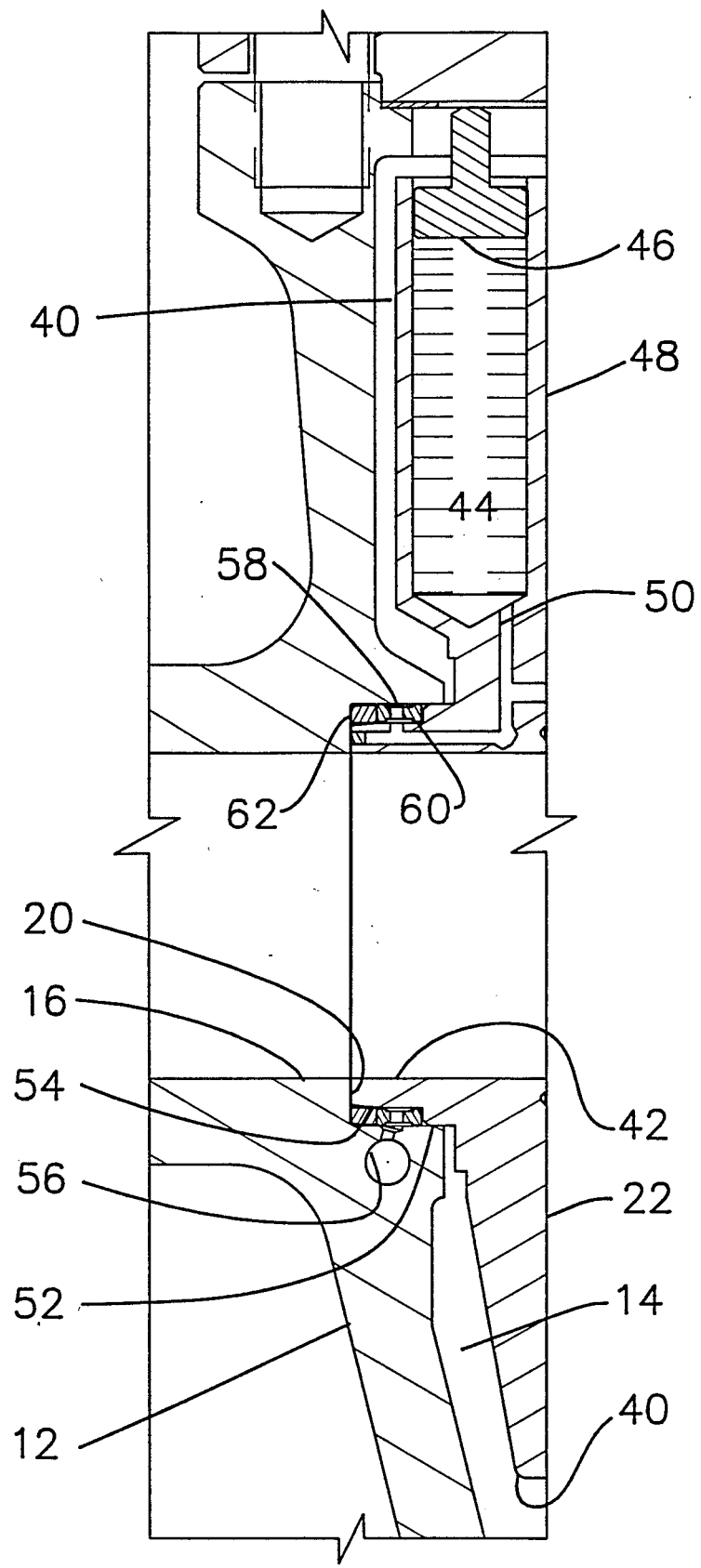
FIG. 2 is a sectional view of the improved seal ring of the present invention showing the automatic lubrication system incorporated therein.
Figure 5:
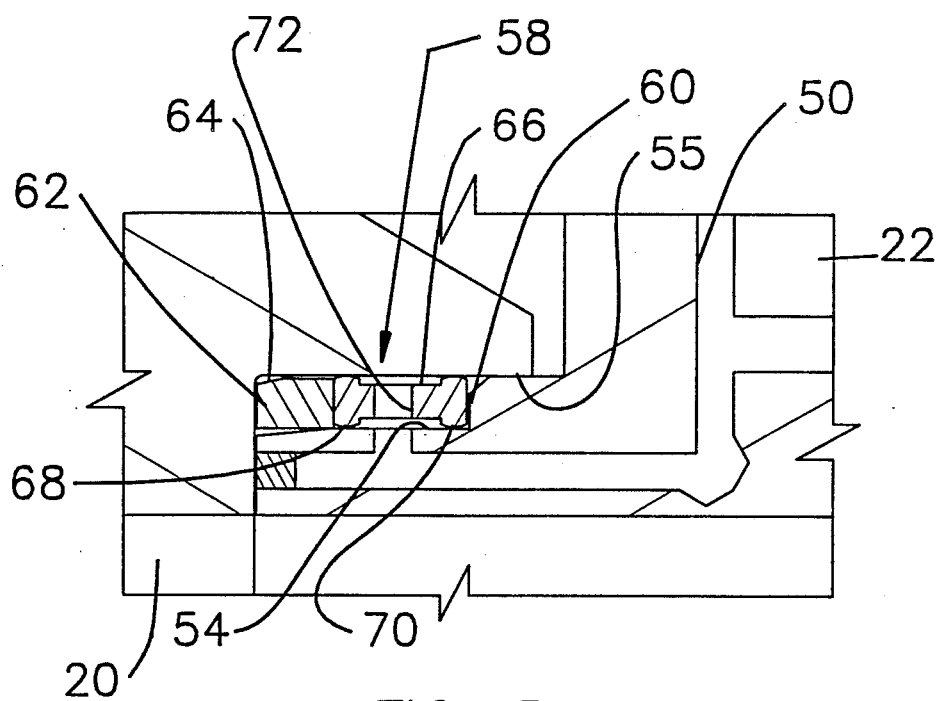
FIG. 5 is a partial detail section view of the assembled seat ring and seal ring positioned within their body recesses.

Seat rings 22 and 26 are of the same design and include radially extending flange 40 and tubular extension 42 which is received in the recess 20 or 24 surrounding the entry of the inlet 16 or outlet 18 into chamber 14. Inlet seat ring 22 is shown in greater detail in FIG. 2. Flange 40 includes sealant chamber 44 which is open at its upper end and has piston 46 positioned therein for movement responsive to pressure from above, which pressure is the pressure within chamber 14. Inner surface 48 of seat ring 22 is flat and provides the surface against which gate 28 moves and seals. Passage 50 extends from the lower portion of chamber 44 and through seat ring 22 into communication with the exterior of tubular extension 42 as shown in FIGS. 2 and 5. Tubular extension 42 includes surface 52 extending from flange 40 which has a diameter allowing it to fit within recess 20 and then is reduced in diameter to exterior surface 54 which has a diameter much smaller then the diameter of sealing surface 55 of recess 20. Passage 56 extends through body 12 and communicates with the interior surface of recess 20 opposite to the opening of passage 50 on surface 54 as shown.

Sealing between the exterior of tubular extension 42 and the interior of recess 20 is provided by sealing means 58 which includes sealing ring 60 and spacer ring 62. As shown in FIGS. 2 and 5, spacer ring 62 includes outer tapered surface 64 which allows it to be easily and quickly inserted into recess 20. Thereafter, sealing ring 60 is inserted into recess 20 in the manner hereinafter set forth and then seat ring 22 is inserted therein as shown in FIG. 5.

Figure 3:
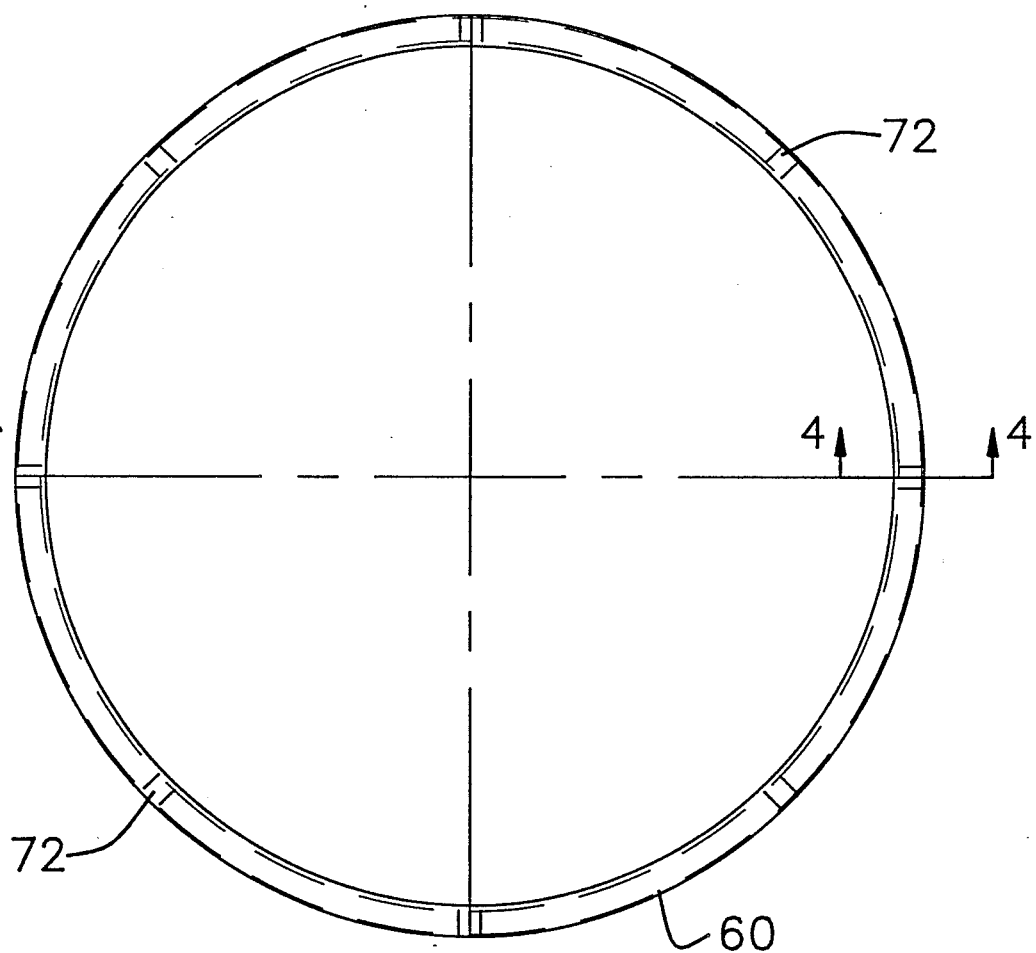
FIG. 3 is a plan view of the seal ring of the present invention.
Figure 4:
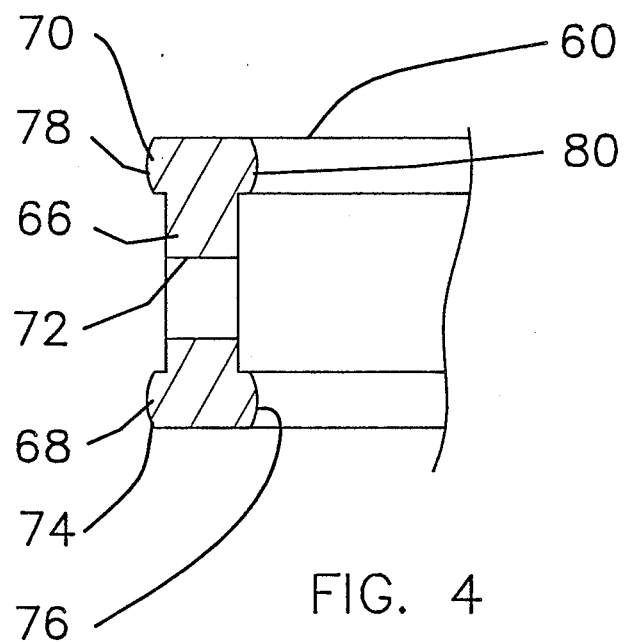
FIG. 4 is a sectional view of the seal ring taken along line 4—4 in FIG. 3.

As shown in FIGS. 3 and 4, sealing ring 60 includes central web or tubular connection 66 between end flanges 68 and 70. A plurality of openings 72 extend through web 66 to provide communication therethrough to the opposite sides of ring 60. Flanges 68 and 70 are of different sizes and flange 68 is herein described as leading flange 68 since it is the flange which is inserted into recess 20 first and flange 70 is described as trailing flange 70 since it follows flange 68 into position within recess 20. Flanges 68 and 70 extend outwardly and inwardly respectively to provide rounded sealing surfaces 74, 76, 78 and 80 as indicated in FIG. 4. The fit of rounded sealing surfaces 74 and 76 on leading flange 68 provides a tight high interference fit within the interior of recess 20 and around the exterior of surface 54 so that there is no leakage from the valve chamber 14 into outlet 18. Leakage from inlet 16 into valve chamber 14 will occur between surface 48 of seat ring 22 and the surface of gate 28 engaging surface 48. Normally, the pressure of the flow of fluids through valve 10 will urge gate 28 into engagement with outlet seat ring 26 for tight sealing because of the pressure loading on gate 28. The fit of rounded sealing surfaces 78 and 80 on traveling flange 70 provides a low interference fit as compared to surfaces 74 and 76. This fit does not need to be so tight as the fit of lead flange 68, since there is relatively small pressure differential exerted across trailing flange 70 as compared to lead flange 68.

An example of the types of interference fits mentioned above is shown by the valve in which the diameter of the counterbore recess sealing surface 55 is 8.250"+0.004", the diameter of the exterior surface 54 of the seat ring is 7.734"−0.002, the diameter of the exterior sealing surface 74 of the leading flange is 8.254"−0.002", the diameter of the exterior sealing surface of the trailing flange is 8.252"−0.002", the radial dimension between the leading inner and outer sealing surfaces is 0.277"−0.003" and the radial dimension between the trailing inner and outer sealing surfaces is 0.267"−0.003". From this it can be seen that there is a substantially larger or higher interference of the leading flange 68 than of the trailing flange 70. The radial dimension or thickness of tubular connection or web 66 is 0.170" and is spaced approximately equal distanced (radially) from the inner and outer sealing surfaces of flanges 68 and 70.

When spacer ring 62, seal ring 60 and seat ring 22 have been installed, as shown, holes 72 are in communication with the opening of passage 50 in surface 54. With the spacing of web 66 from both surface 54 and sealing surface 55 of recess 20, flow of sealant is provided in both directions therebetween to allow external filling through body passage 56 and to allow automatic or pressure responsive flow of sealant from chamber 44.

Figure 6:
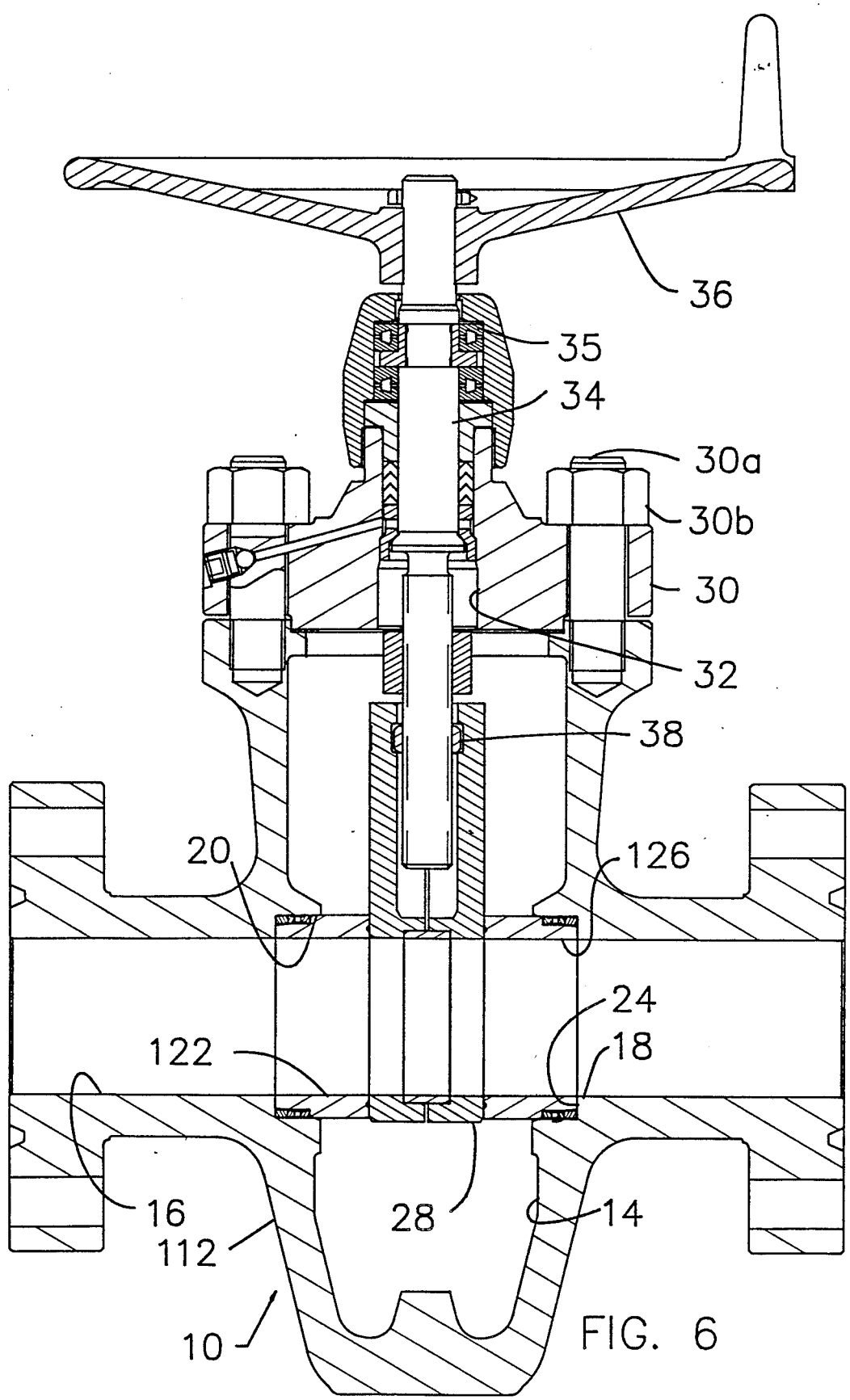
FIG. 6 is an alternate embodiment of the invention.

FIG. 6 is an alternate embodiment of the present invention wherein the parts that are the same as in the preferred embodiment are given the same numbers. Seat rings 122 and 126 are identical and are tubular shaped members without radially extending flanges and sealant injection means. Valve body 112 is the same as valve body 12 except sealant passage 56 is not present. Seat ring 122 and its seal means can best be described with reference to FIG. 7. Seat ring 122 is tubular in shape and has a reduced diameter exterior surface 154 to accept the spacer ring 62 and seal ring 60 used in the preferred embodiment. Exterior diameter 157 of seat ring 122 fits closely within recess 20 of body 112. Innermost end 159 of seat ring 122 sealingly engages gate 28. The diameter of exterior surface 154 is the same as exterior surface 54 of the preferred embodiment, i.e., 7.734"−0.002". Therefore, it can be seen that seal ring 60 operates in the alternate embodiment in the same manner as it does in the preferred embodiment.

Figure 7:
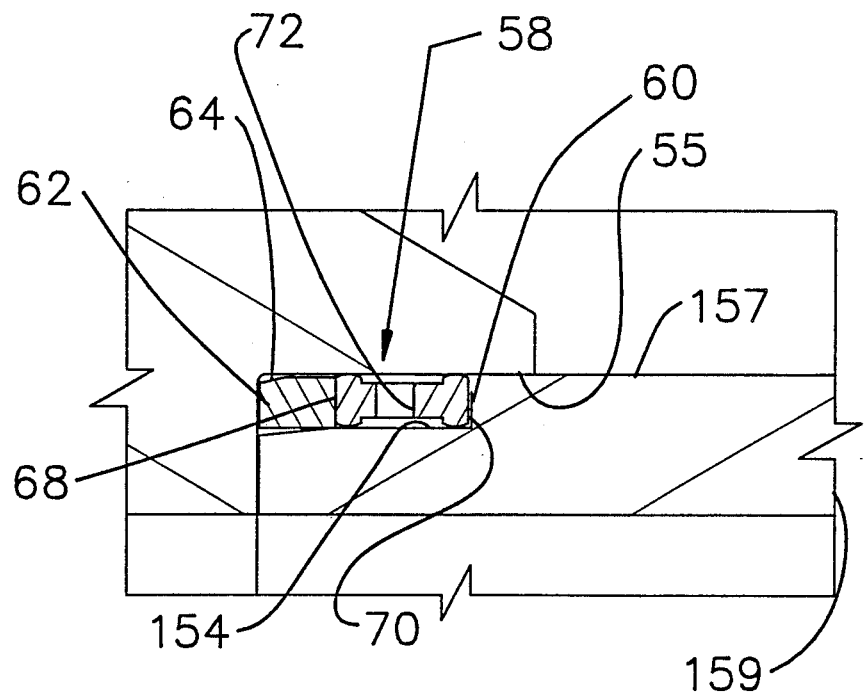
FIG. 7 is a sectional view of the seal ring and seat ring of the alternate embodiment of FIG. 6.

While the preferred embodiment shown and described herein relates to a gate valve having a pressure responsive system for the automatic injection of sealant, the improved structure may be used in other gate valve applications as shown and described with reference to the alternate embodiment illustrated in FIGS. 6 and 7.

What is claimed is:

1. A gate valve comprising
   a body having a valve chamber, an inlet extending from the exterior of the body into the valve chamber, an outlet extending from the exterior of the body into the valve chamber, an inlet seat recess surrounding the opening of the inlet in the valve chamber and an outlet seat recess surrounding the opening of the outlet into the valve chamber,
   a valve member positioned within said valve chamber for movement between a first position closing flow between the inlet and the outlet and a second position opening flow between the inlet and the outlet,
   means for moving said valve member between such positions,
   an inlet seat ring positioned in said inlet seat recess,
   an outlet seat ring positioned in said outlet seat recess,
   each of said seat rings including
      an annular body having a tubular portion for engagement within said seat recesses and said tubular portion having a section of reduced diameter which when installed within its seat recess is spaced therefrom, said tubular portion having an external diameter substantially the same as the inner diameter of said seat recess, a reduced diameter end which is substantially smaller than the inner diameter of said seat recess, a seal ring positioned around the exterior of the reduced diameter end of said tubular portion and within said recess and having a first sealing element, a second sealing element and a tubular connecting element joined between said first and second sealing elements, a port extending through said tubular connecting element, said seal ring being in sealing position around said tubular portion of said seat ring and having its first sealing element positioned the farthest in said recess, said first sealing element having external and internal diameters providing a high interference sealing engagement with the interior of said recess and the exterior of said reduced diameter end of said tubular portion of said seat ring, said second sealing element having external and internal diameters providing a low interference sealing engagement with the interior of said recess and the exterior of said reduced diameter end of said tubular portion of said seat ring, and said first and second sealing elements preventing fluid leakage between the inlet and the outlet.

2. A gate valve according to claim 1 wherein said seal ring includes a leading flange having inner and outer sealing surfaces thereon, a trailing flange having inner and outer sealing surfaces thereon, and a central web being tubular in shape and extending between the leading and trailing flanges and being integral therewith.

3. A gate valve comprising a body having a valve chamber, an inlet extending from the exterior of the body into the valve chamber, an outlet extending from the exterior of the body into the valve chamber, an inlet seat recess surrounding the opening of the inlet in the valve chamber and an outlet seat recess surrounding the opening of the outlet into the valve chamber, a valve member positioned within said valve chamber for movement between a first position closing flow between the inlet and the outlet and a second position opening flow between the inlet and the outlet, means for moving said valve member between such positions, an inlet seat ring positioned in said inlet seat recess, an outlet seat ring positioned in said outlet seat recess, each of said seat rings including an annular body having a tubular portion for engagement within said seat recesses and a radial portion, said tubular portion having a section of reduced diameter which when installed within its seat recess is spaced therefrom, a cylindrical chamber within said radial portion, a piston positioned within said cylindrical chamber, said tubular portion having an external diameter adjacent said radial portion substantially the same as the inner diameter of said seat recess, a reduced diameter end which is substantially smaller than the inner diameter of said seat recess and a passage communicating from said cylindrical chamber to the exterior of said reduced diameter end of said tubular portion, means for introducing a sealant through said valve body and said seat ring for filling the cylindrical chamber and said passage therein, a seal ring positioned around the exterior of the reduced diameter end of said tubular portion and within said recess and having a first sealing element, a second sealing element and a tubular connecting element joined between said first and second sealing elements, a port extending through said tubular connecting element, said seal ring being in sealing position around said tubular portion of said seat ring and having its connecting element facing the opening of said passage and its first sealing element positioned the farthest in said recess, said first sealing element having external and internal diameters providing a high interference sealing engagement with the interior of said recess and the exterior of said reduced diameter end of said tubular portion of said seat ring, said second sealing element having external and internal diameters providing a low interference sealing engagement with the interior of said recess and the exterior of said reduced diameter end of said tubular portion of said seat ring, and said first and second sealing elements preventing any fluid leakage between the inlet and the outlet.

4. A gate valve according to claim 3 wherein said sealant passage opens on the exterior sealing surface of said seat ring facing the inner sealing surface of said recess, said leading flange being spaced and sealing axially away from the opening of said sealant passage in one direction and said trailing flange being spaced and sealing away from the opening of said sealant passage in the opposite direction.

5. A gate valve according to claim 3 wherein said retaining means includes a spacer ring positioned between the interior of said seat recess and the exterior of said seat ring and being in engagement with an interior radial surface of the seat recess and by the leading flange to position the seal ring in its desired position.

6. An improved seat ring seal for sealing across an annular space between the exterior surface of a seat ring and the inner surface of a counterbore recess surrounding the entry of at least one of an inlet and an outlet which extend through a valve body into a gate chamber of a gate valve, the counterbore recess having an annular sealing surface and a radially extending shoulder, the seat ring having a fluid sealant system with a passage opening in the intermediate portion of the seat ring sealing surface, comprising a seal ring having a radially extending leading flange with inner and outer leading sealing surfaces, a radially extending trailing flange with inner and outer trailing sealing surfaces and a tubular connection being integral with said flanges and extending between the radial central portion of said flanges, said tubular connection having an inner diameter greater than the inner diameters of said leading and trailing inner sealing surfaces, an outer diameter less than the diameter of the leading and trailing outer sealing surfaces and at least one opening extending radially through said tubular connection, and the inner and outer diameters of said leading sealing surfaces providing a high interference fit with the exterior surface of the seat ring and the inner surface of the counterbore recess, and said seal ring preventing any fluid leakage between the inlet and the outlet.

7. An improved seat ring seal according to claim 6 including
  means for positioning said seal ring in a position with its flange sealing surfaces being on opposite sides of the passage opening in said seat ring sealing surface.

8. An improved seat ring seal according to claim 7 wherein said positioning means includes
  a spacer ring positioned the counterbore recess between the recess shoulder and the seal ring.

* * * * *